April 12, 1955  S. L. FREERS ET AL  2,706,020
POWER BRAKE WITH VARIABLE RATIO LEVER
Filed Dec. 14, 1953  2 Sheets-Sheet 1
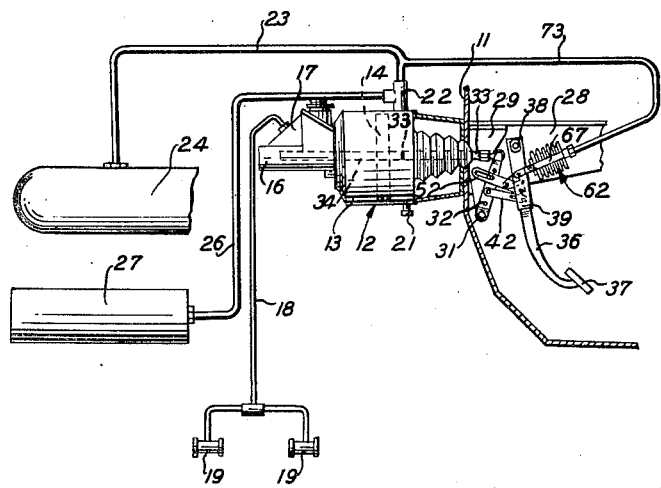
FIG. 1
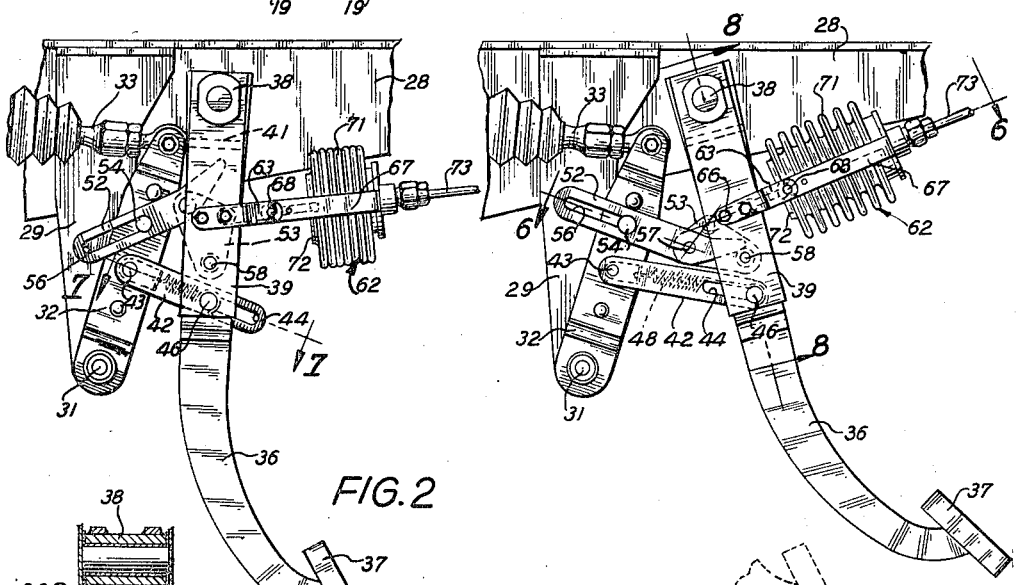
FIG. 2
FIG. 3
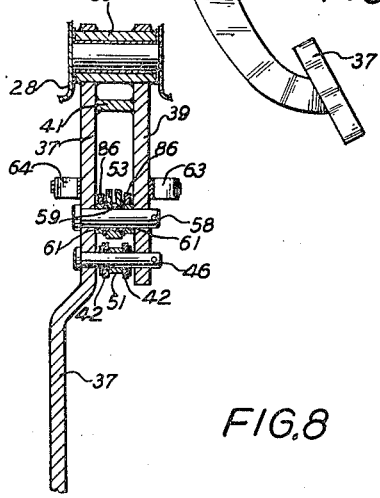
FIG. 8
S. L. FREERS
W. H. McAFEE
INVENTORS
E. C. McRae
BY J. R. Faulkner
J. H. Oster
ATTORNEYS April 12, 1955   S. L. FREERS ET AL   2,706,020
POWER BRAKE WITH VARIABLE RATIO LEVER
Filed Dec. 14, 1953   2 Sheets-Sheet 2

S. L. FREERS
W. H. McAFEE
INVENTORS

BY
ATTORNEYS

United States Patent Office 2,706,020
Patented Apr. 12, 1955

2,706,020

POWER BRAKE WITH VARIABLE RATIO LEVER

Sidney L. Freers, Clawson, and Warren H. McAfee, Detroit, Mich., assignors to Ford Motor Company, Dearborn, Mich., a corporation of Delaware Application December 14, 1953, Serial No. 398,072

6 Claims. (Cl. 188—152)

This invention relates generally to power brakes for motor vehicles, and has particular reference to a power brake booster unit of the vacuum type.

Power brake booster units of the vacuum type for motor vehicles conventionally use a construction in which the manual effort applied to the brake pedal is augmented by a booster unit utilizing the differential pressure between the atmosphere and the vacuum supplied by the vehicle engine manifold. In the event of failure of the vacuum supply, the brakes can still be applied by direct manual effort. A low pedal ratio and a low pedal position are usually used with power brake installations, and while the booster unit permits the use of a low pedal ratio with an acceptable pedal pressure, the arrangement greatly increases the pedal pressure required to actuate the brakes and stop the vehicle in the event of failure of the vacuum supply. In addition, the low pedal position reduces the amount of pedal travel permitted should it be necessary to apply the brakes manually in the event of power failure. It is therefore an object of the present invention to provide a power brake construction in which a low pedal ratio and a low pedal position are utilized during normal operation of the power brake mechanism, but in which the pedal ratio is automatically increased and the pedal position is automatically raised in the event the booster unit becomes inoperative due to failure of the vacuum supply. Thus, should it become necessary to apply the brakes without power assistance the increased pedal ratio and the higher pedal position facilitate the manual application of the brakes. This arrangement is also of advantage when starting a car having an automatic transmission, since with an automatic transmission it is conventional to require the control lever to be moved from the park position to the neutral position in order to permit the engine to be started, and if the vehicle is parked on an incline the car may commence to roll prior to the starting of the engine. Under these circumstances the construction of the present invention provides sufficient brake travel and leverage to apply the brakes properly by manual effort alone, even though the vacuum supply is not available. Furthermore, the arrangement is such that upon reinstatement of the vacuum supply to again render the booster unit operative the original low pedal ratio and low pedal position are automatically reinstated.

Other objects and advantages of this invention will be made more apparent as this description proceeds, particularly when considered in connection with the accompanying drawings, wherein:

Figure 1 is a semidiagrammatic side elevational view of a power brake mechanism incorporating the present invention.

Figure 2 is an enlarged elevational view of a portion of the construction shown in Figure 1, with the mechanism in position for power application of the brakes.

Figure 3 is a view similar to Figure 2 but illustrating the position of the parts with a power failure, and ready for manual application of the brakes.

Figure 8 is an enlarged cross-sectional view taken on the line 8—8 of Figure 3.

Figures 4, 5:
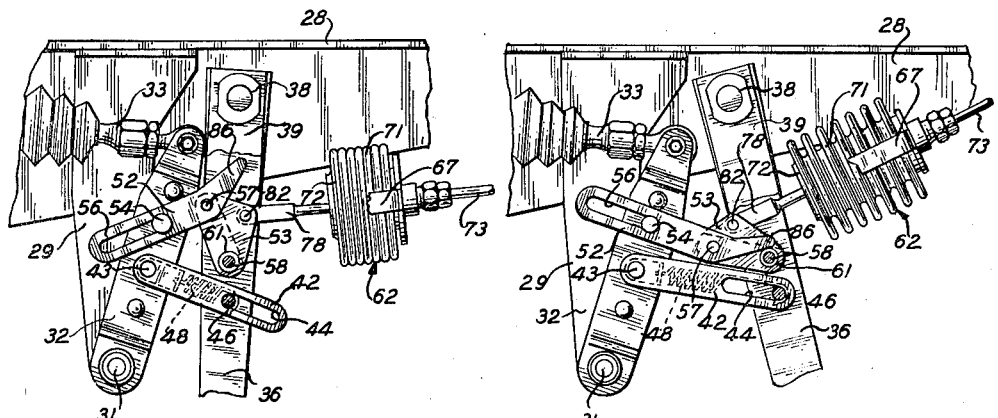
Figure 4 is a side elevational view similar to Figure 2 but having certain parts broken away for the purpose of clearness.
Figure 5 is a side elevational view similar to Figure 3 but having certain parts broken away for the purpose of clearness.

Referring now to the drawings, and particularly to Figure 1, the reference character 11 indicates the dash panel of a motor vehicle. Secured to the dash panel on the engine compartment side thereof is a power brake booster unit 12 of conventional construction. The unit 12 comprises a booster cylinder 13, a piston 14 reciprocable in the cylinder, and a hydraulic master cylinder 16 provided with an integral reservoir 17. The master cylinder is connected by means of a conduit 18 to wheel brake cylinders 19. The booster cylinder 13 is provided with an air inlet 21 and with a vacuum inlet 22, the latter being connected by means of a conduit 23 to the intake manifold 24 of the vehicle engine (not shown). The inlet 22 is also connected by means of a conduit 26 to a vacuum reservoir tank 27.

Extending rearward from the dash panel 11 of the vehicle is a structural member 28. Secured to the structural member 28 and depending downwardly therefrom is a supporting bracket 29 forming a support for the pivotal mounting 31 of a brake applying lever 32. The upper end of the brake applying lever 32 is connected by means of a connecting rod 33 to the piston 14 in the booster cylinder 13.

Movable with the connecting rod 33 and the piston 14 is a piston rod 34. The piston rod 34 extends into the master cylinder 16 and upon forward movement thereof displaces hydraulic fluid from the master cylinder into the conduit 18 leading into the wheel cylinders 19 to apply the wheel brakes (not shown).

Counterclockwise swinging movement of the brake applying lever 32 about its pivotal mounting 31, as seen in Figure 1, actuates conventional valving to expose the rearward face of the piston 14 to atmospheric pressure and the forward face of the piston to the vacuum of the intake manifold 24 to move the piston 14 and piston rod 34 to the left under power actuation, and to thus apply the brakes. It will be seen that the direct mechanical connection between the connecting rod 33 and the piston rod 34 makes it possible to move the piston rod 34 into the master cylinder 16 to displace fluid therefrom and to apply the brakes manually in the event of failure of the vacuum supply from the intake manifold 24.

Referring now to Figures 2 and 4, and also to Figure 8, the reference character 36 indicates a brake pedal arm carrying at its lower extremity a pedal pad 37 for operation by the driver. The brake pedal arm 36 is pivotally supported at its upper end upon the structural member 28 by means of a hub 38 journaled in the structural member and having its opposite ends welded to the brake pedal arm 36 and to a brake pedal lever 39 extending parallel to the brake pedal arm for a portion of its length and spaced therefrom. A flat reinforcing spacer 41 is welded between the brake pedal arm 36 and the brake pedal lever 39 to complete a rigid assembly.

Figure 7:
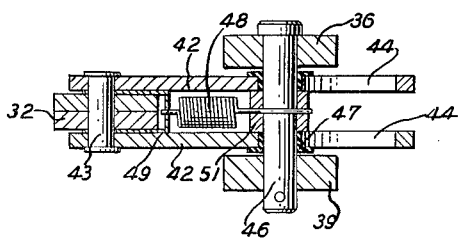
Figure 7 is an enlarged cross-sectional view taken on the line 7—7 of Figure 2.

Referring now to Figure 7, as well as Figures 2 and 4, a pair of identical lower links 42 form an operative thrust connection between the brake pedal arm 36 and the brake applying lever 32 during power application of the brake mechanism. The lower links 42 straddle the brake applying lever 32, which is of double thickness, and are pivotally connected thereto by means of a pivot pin 43. The opposite ends of the lower links 42 are formed with aligned slots 44 receiving a pin 46 which extends through the brake pedal arm 36 and the brake pedal lever 39. Nylon bushings 47 insulate the pivot pin 46 from the links 42.

The brake pedal arm 36 is normally held in the position shown in Figures 2 and 4 with the pivot pin 46 against the ends of the slots 44 in the links 42 by means of a coil spring 48 having one end anchored to a spring bracket 49 carried by the pivot pin 43 and the opposite end hooked around a spacer 51 surrounding the pivot pin 46.

It will be seen that the lower links 42 form a compression connection between the brake pedal arm 36 and the brake applying lever 32 permitting foot pedal pressure applied to the pedal pad 37 to be transmitted to the brake mechanism at a predetermined relatively low pedal ratio. In addition, the brake pedal arm 36 and pedal pad 37 are normally positioned relatively low so as to facilitate the transfer of the driver's foot from the accelerator pedal to the brake pedal.

The brake pedal arm 36 and the brake applying lever 32 are also interconnected by means of a toggle linkage comprising a long toggle link 52 and a short triangularly shaped toggle link 53. The long toggle links 52 are identical in shape, and straddle the double thickness brake applying lever 32 and are pivotally connected thereto by means of a pivot pin 54 carried by the brake applying lever 32 and extending through elongated slots 56 in the toggle links 52.

The long toggle links 52 also straddle the short toggle link 53, being pivotally connected thereto by means of a pivot pin 57. The opposite end of the short toggle link 53 is pivotally connected to the brake pedal arm 36 by means of a pivot pin 58 extending through the brake pedal arm 36 and the brake pedal lever 39 carried thereby. As best seen in Figure 8, nylon bushings 59 insulate the short toggle link 53 from the pivot pin 58, and a pair of spacers 61 center the short toggle link 53 between the brake pedal arm 36 and the brake pedal lever 39.

The toggle connection comprising the toggle links 52 and 53 is normally held in an inoperative articulated position as shown in Figures 2 and 4 by means of a bellows unit 62 whenever engine vacuum is available, since under these conditions the power brake booster unit 12 is operative to assist in the application of the brakes, and the low pedal ratio and low pedal position shown in Figures 2 and 4 are effective.

Figure 6:
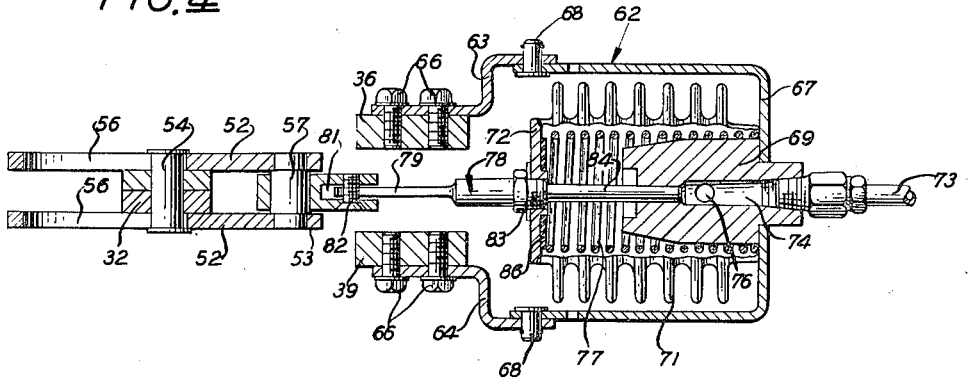
Figure 6 is an enlarged cross-sectional view taken along the line 6—6 of Figure 3.

The construction of the bellows unit 62 is best shown in Figure 6, and it will be seen that a pair of Z-shaped supporting brackets 63 and 64 are secured to the brake pedal arm 36 and the brake pedal 39 respectively by means of studs 66.

A U-shaped bracket 67 is carried by the supporting brackets 63 and 64, being pivotally connected thereto by means of pins 68. The bracket 67 carries a hub 69 and an expansible Sylphon or bellows 71 having its opposite end closed by an end plate 72.

Vacuum is supplied to the interior of the bellows 71 through a conduit 73 from the vacuum inlet 22 and through the bore 74 of the hub 69 and a cross passage 76 to the interior of the bellows. A coil spring 77 is contained within the bellows 71 surrounding the hub 69 and serves to expand the bellows to the position shown in Figure 6 when the vacuum supply fails.

As seen in Figure 6, the end plate 72 of the bellows 71 is connected by means of a push rod 78 to the short link 53 of the toggle. The end of the push rod 78 is flattened at 79 and extends into a slot 81 formed in the short toggle link 53, being pivotally connected to the toggle link 53 by means of a pivot pin 82. The intermediate portion 83 of the push rod is threaded for adjustable connection to the end plate 72 of the bellows. Beyond the threaded portion 83 the push rod 78 is formed with an extension 84 piloted in the hub 69. The end plate 72 is provided with a rubber bumper 86 adapted to engage the adjacent end of the hub 69 of the bellows assembly 62 when the bellows 71 is collapsed.

In the position of the parts as shown in Figures 2 and 4, the bellows 71 is supplied with vacuum and is in a collapsed position. In this position the push rod 78 between the bellows and the short toggle link 53 swings the toggle link 53 in a clockwise direction about its pivotal connection 58 to the brake pedal arm 36, thus collapsing the toggle and moving the toggle links 52 and 53 to an inoperative articulated position. Under these circumstances the lower links 42 form the thrust connection between the brake pedal arm 36 and the brake applying lever 32 so that manual operation of the brake pedal arm by pressure upon the pedal pad 37 transmits force through the lower links 42 to the brake applying lever 32 and thence to the brake booster mechanism.

Should the supply of vacuum be interrupted for any reason, such as stalling of the engine or when the vehicle is parked and the engine shut off, the spring 77 within the bellows 71 expands the bellows from the position shown in Figures 2 and 4 to the position shown in Figures 3 and 5. The expansion of the bellows, which is carried by the brake pedal arm 36, swings the short toggle link 53 in a counterclockwise direction about its pivotal connection 58 to the brake pedal arm 36, through the interconnected push rod 78. This straightens the toggle formed of the links 52 and 53 and moves it to an overcenter position as shown in Figures 3 and 5. In this connection it should be noted that the long toggle links 52 are formed with end extensions 86 which in the straightened position of the toggle engage the spacers 61 surrounding the pivot pin 58 connecting the short toggle link 53 to the brake pedal arm 36.

The above described extension of the toggle effected by the coil spring 77 when the vacuum supply is cut off from the bellows 71 is effective to swing the brake pedal arm 36 in a counterclockwise direction about its pivotal connection 38 with the vehicle structural member 28. This moves the brake pedal arm 36 and the pedal pad 37 to a new and higher position so that a greater pedal travel is available for manual operation of the brakes in the event of power failure. In addition, the brake pedal ratio is increased since the straightened toggle links 52 and 53 now form the thrust connection between the brake pedal arm 36 and the brake applying lever 32, thus overriding the lower links 42. The slots 44 in the lower links 42 accommodate the separation of the brake pedal arm 36 and the brake applying lever 32 when the toggle is straightened.

From the foregoing it will be apparent that failure of the vacuum supply automatically operates, through the mechanism described, to increase the pedal ratio and also to raise the pedal position so as to permit greater pedal travel which may be necessary during manual operation of the brakes at the increased pedal ratio. These changes are effected automatically upon vacuum failure, and are also effective when the vehicle is parked and the engine shut off. For example, many automatic transmissions require the transmission control lever to be moved from the park position to the neutral position in order to permit the engine to be started. Should the car be parked on an incline it might then begin to roll, and the increased pedal ratio and higher pedal position would then be advantageous since the element of surprise might otherwise permit the vehicle to roll into danger before the driver applied the requisite high pressure.

In the event of vacuum supply failure at a time when the driver has his foot on the brake pedal, the pedal cannot of course be moved to its higher position. However, by pumping the brakes under these circumstances the pedal would automatically move to its higher position and the pedal ratio increase simultaneously.

Reinstatement of the vacuum supply after a failure thereof automatically collapses the toggle formed of the toggle links 52 and 53, and the coil spring 48 between the lower links 42 then operates to return the brake pedal arm 36 to the position shown in Figures 2 and 4 in which the lower links 42 form the thrust connection between the brake pedal arm 36 and the brake applying lever 32, thereby restoring the low pedal ratio and the low pedal position desired for power brake application.

It will be understood that the invention is not to be limited to the exact construction shown and described, but that various changes and modifications may be made without departing from the spirit and scope of the invention, as defined in the appended claims.

What is claimed is:

1. In a motor vehicle having a hydraulic brake system, a source of vacuum and a support, a vacuum operated power brake device for normally actuating said hydraulic brake system, a brake applying lever pivotally mounted upon said support, means connecting said brake applying lever to said power brake device, a brake pedal lever pivotally mounted upon said support adjacent said brake applying lever, a link interconnecting said brake pedal lever and said brake applying lever to transmit force from said pedal lever to said applying lever, said link having a lost motion connection with one of said levers, a toggle comprising a pair of toggle links pivotally connected to each other and having their opposite ends pivotally connected to said brake pedal lever and said brake applying lever respectively, a servo unit mounted upon one of said levers, a movable element carried by said servo unit, means connecting said element to one of said toggle links, a spring acting upon said element tending to straighten said toggle, and an expansible chamber on said servo unit adjacent said element connected to said source of vacuum to move said element against said spring to a position in which said toggle is collapsed.

2. In a motor vehicle having a hydraulic brake system, a source of vacuum and a support, a vacuum operated power brake device for normally actuating said hydraulic brake system, a brake applying lever pivotally mounted upon said support, means connecting said brake applying lever to said power brake device, a brake pedal lever pivotally mounted upon said support adjacent said brake lever, a toggle link pivotally connected to one of said levers, a second toggle link having a lost motion pivotal connection with the other of said levers, means pivotally connecting said two toggle links together, a servo unit carried by one of said levers and connected to one of said toggle links, means connecting said servo unit to said source of vacuum to normally collapse the toggle formed by said two toggle links when vacuum is available at said source of vacuum, a link pivotally connected to said brake pedal lever and to said brake applying lever at points spaced from the pivotal connections of said toggle links to said levers, said last mentioned link being operative to transmit force from said pedal lever to said brake applying lever at a predetermined ratio when said toggle is collapsed, and spring means associated with said servo unit and acting upon one of said toggle links in the event of failure of the vacuum supply to straighten the toggle and enable force to be transmitted from said brake pedal lever to said brake applying lever through said toggle links at a different ratio.

3. The structure defined by claim 2 which is further characterized in that one of said toggle links has an extension engageable with the pivotal connection between the other of said toggle links and the adjacent lever, said extension being arranged to permit overcenter movement of said toggle links under the actuation of said spring and to limit the overcenter movement.

4. The structure defined by claim 2 which is further characterized in that said last mentioned link has a pin and slot lost motion connection with one of said levers permitting swinging movement of said brake pedal lever away from said brake applying lever when said toggle is straightened to move said brake pedal lever to a higher position permitting greater pedal travel.

5. The structure defined by claim 2 which is further characterized in that said servo unit comprises a supporting bracket secured to said brake pedal lever, an expansible bellows having one end connected to said bracket, an end plate closing the opposite moveable end of said bellows, a push rod connected to said end plate and pivotally connected to an intermediate portion of one of said toggle links, a conduit from said source of vacuum communicating with the interior of said bellows to collapse the latter when vacuum is available at said source to swing said toggle links to an inoperative articulated relationship, and a coil spring within said bellows acting upon said end plate to swing said toggle links to an operative straightened relationship upon the failure of the vacuum supply.

6. In a motor vehicle having a source of vacuum power and a support, a vacuum operated power brake device mounted upon said support, a pair of levers pivotally connected to said support, means connecting one of said levers to said power brake device, a manually operable pedal carried by the other of said levers, a link interconnecting said levers having a pivot connection at one end with one of said levers and a pin and slot lost motion connection at its other end with the other of said levers, a pair of interconnected toggle links forming an alternate connection between said levers, said toggle links being pivotally connected to each other and one of said toggle links having a pivotal connection with one lever while the other of said toggle links has a pin and slot lost motion connection with the other of said levers, an expansible servo unit carried by one of said levers and having an operative connection to one of said toggle links, means connecting said servo unit to said source of vacuum power to collapse said servo unit and through said operative connection with said one toggle link to swing said toggle links to an inoperative articulated relationship so that said first mentioned link forms a thrust connection between said levers transmitting force therebetween at a predetermined ratio when manual effort is applied to said foot pedal, and spring means associated with said servo unit expanding the latter upon the failure of said source of vacuum power to swing said toggle links to an operative straightened position in which force is transmitted between said levers through said straightened links at a different ratio upon the application of pressure to said foot pedal.

References Cited in the file of this patent

UNITED STATES PATENTS

| | | |
|---|---|---|
| 1,958,511 | Dodge | May 15, 1934 |
| 2,037,869 | Wall | Apr. 21, 1936 |
| 2,365,960 | Ingres | Dec. 26, 1944 |